(12) United States Patent
Costello et al.

(10) Patent No.: US 11,444,900 B2
(45) Date of Patent: Sep. 13, 2022

(54) CHAT ROOM ACCESS CONTROL

(71) Applicant: Cisco Technology, Inc., San Jose, CA (US)

(72) Inventors: John Costello, Claregalway (IE); Andrew Henderson, Spiddal (IE); Robert Headon, Garway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 116 days.

(21) Appl. No.: 16/799,571

(22) Filed: Feb. 24, 2020

(65) Prior Publication Data
US 2020/0195596 A1 Jun. 18, 2020

Related U.S. Application Data

(63) Continuation of application No. 15/196,063, filed on Jun. 29, 2016, now Pat. No. 10,574,609.

(51) Int. Cl.
*H04L 12/58* (2006.01)
*H04L 12/18* (2006.01)
(Continued)

(52) U.S. Cl.
CPC ........ *H04L 51/212* (2022.05); *H04L 12/1813* (2013.01); *H04L 12/1822* (2013.01);
(Continued)

(58) Field of Classification Search
CPC ... H04L 51/12; H04L 12/1822; H04L 63/065; H04L 63/105; H04L 41/5093; H04L 12/1813; H04L 51/04
(Continued)

(56) References Cited

U.S. PATENT DOCUMENTS 4,460,807 A 7/1984 Kerr et al.
4,890,257 A 12/1989 Anthias et al.
(Continued)

FOREIGN PATENT DOCUMENTS

CN 101055561 10/2007
CN 102572370 7/2012
(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.
(Continued)

*Primary Examiner* — Glenford J Madamba
(74) *Attorney, Agent, or Firm* — Polsinelli

(57) ABSTRACT

In one embodiment, a request to join an electronic chat room is received from a requester. A selection of an access control level for the requester is received via a user interface in order to grant the requester access to the electronic chat room according to a condition for granting access. The user interface is used to assign a selected access control level to the requester, thereupon granting access to the requester. The requester's access to content available in the electronic chat room being limited based on the selected access control level. Related methods, apparatus, and systems are also described.

19 Claims, 4 Drawing Sheets

(51) Int. Cl.
*H04L 12/24* (2006.01)
*H04L 29/06* (2006.01)
*H04L 51/212* (2022.01)
*H04L 51/04* (2022.01)
*H04L 9/40* (2022.01)
*H04L 41/50* (2022.01)

(52) U.S. Cl.
CPC .......... *H04L 41/5093* (2013.01); *H04L 51/04* (2013.01); *H04L 63/065* (2013.01); *H04L 63/105* (2013.01)

(58) Field of Classification Search
USPC ........................................................ 709/206
See application file for complete search history.

(56) References Cited

U.S. PATENT DOCUMENTS

| | | | |
|---|---|---|---|
| 5,694,563 | A | 12/1997 | Belfiore et al. |
| 5,699,082 | A | 12/1997 | Marks et al. |
| 5,745,711 | A | 4/1998 | Kitahara et al. |
| 5,767,897 | A | 6/1998 | Howell |
| 5,825,858 | A | 10/1998 | Shaffer et al. |
| 5,874,962 | A | 2/1999 | de Judicibus et al. |
| 5,995,096 | A | 11/1999 | Kitahara et al. |
| 6,040,817 | A | 3/2000 | Sumikawa |
| 6,075,531 | A | 6/2000 | DeStefano |
| 6,085,166 | A | 7/2000 | Beckhardt et al. |
| 6,191,807 | B1 | 2/2001 | Hamada et al. |
| 6,300,951 | B1 | 10/2001 | Filetto et al. |
| 6,392,674 | B1 | 5/2002 | Hiraki et al. |
| 6,463,473 | B1 | 10/2002 | Gubbi |
| 6,466,419 | B1 | 10/2002 | Mao |
| 6,554,433 | B1 | 4/2003 | Holler |
| 6,573,913 | B1 | 6/2003 | Butler et al. |
| 6,646,997 | B1 | 11/2003 | Baxley et al. |
| 6,665,396 | B1 | 12/2003 | Khouri et al. |
| 6,754,321 | B1 | 6/2004 | Innes et al. |
| 6,754,335 | B1 | 6/2004 | Shaffer et al. |
| RE38,609 | E | 10/2004 | Chen et al. |
| 7,058,164 | B1 | 6/2006 | Chan et al. |
| 7,058,710 | B2 | 6/2006 | McCall et al. |
| 7,062,532 | B1 | 6/2006 | Sweat et al. |
| 7,085,367 | B1 | 8/2006 | Lang |
| 7,124,164 | B1 | 10/2006 | Chemtob |
| 7,139,732 | B1 * | 11/2006 | Desenberg ....... G06Q 10/06395 705/37 |
| 7,149,499 | B1 | 12/2006 | Oran et al. |
| 7,180,993 | B2 | 2/2007 | Hamilton |
| 7,209,475 | B1 | 4/2007 | Shaffer et al. |
| 7,418,664 | B2 | 8/2008 | Ben-Shachar et al. |
| 7,441,198 | B2 | 10/2008 | Dempski et al. |
| 7,478,339 | B2 | 1/2009 | Pettiross et al. |
| 7,530,022 | B2 | 5/2009 | Ben-Shachar et al. |
| 7,577,711 | B2 | 8/2009 | McArdle |
| 7,620,902 | B2 | 11/2009 | Manion et al. |
| 7,634,533 | B2 | 12/2009 | Rudolph et al. |
| 7,792,277 | B2 | 9/2010 | Shaffer et al. |
| 7,881,450 | B1 | 2/2011 | Gentle et al. |
| 7,920,160 | B2 | 4/2011 | Tamaru et al. |
| 7,956,869 | B1 | 6/2011 | Gilra |
| 8,059,557 | B1 | 11/2011 | Sigg et al. |
| 8,081,205 | B2 | 12/2011 | Baird et al. |
| 8,274,893 | B2 | 9/2012 | Bansal et al. |
| 8,290,998 | B2 | 10/2012 | Stienhans et al. |
| 8,340,268 | B2 | 12/2012 | Knaz |
| 8,358,327 | B2 | 1/2013 | Duddy |
| 8,423,615 | B1 | 4/2013 | Hayes |
| 8,428,234 | B2 | 4/2013 | Knaz |
| 8,434,019 | B2 | 4/2013 | Nelson |
| 8,456,507 | B1 | 6/2013 | Mallappa et al. |
| 8,462,103 | B1 | 6/2013 | Moscovitch et al. |
| 8,478,848 | B2 | 7/2013 | Minert |
| 8,630,208 | B1 | 1/2014 | Kjeldaas |
| 8,638,354 | B2 | 1/2014 | Leow et al. |
| 8,675,847 | B2 | 3/2014 | Shaffer et al. |
| 8,694,587 | B2 | 4/2014 | Chaturvedi et al. |
| 8,694,593 | B1 | 4/2014 | Wren et al. |
| 8,706,539 | B1 | 4/2014 | Mohler |
| 8,751,572 | B1 | 6/2014 | Behforooz et al. |
| 8,831,505 | B1 | 9/2014 | Seshadri |
| 8,890,924 | B2 | 11/2014 | Wu |
| 8,892,646 | B2 | 11/2014 | Chaturvedi et al. |
| 8,924,862 | B1 | 12/2014 | Luo |
| 8,930,840 | B1 | 1/2015 | Riskó et al. |
| 9,031,839 | B2 | 5/2015 | Thorsen et al. |
| 9,032,028 | B2 | 5/2015 | Davidson et al. |
| 9,118,612 | B2 | 8/2015 | Fish et al. |
| 9,131,017 | B2 | 9/2015 | Kurupacheril et al. |
| 9,137,376 | B1 | 9/2015 | Basart et al. |
| 9,143,729 | B2 | 9/2015 | Anand et al. |
| 9,197,701 | B1 | 11/2015 | Petrov et al. |
| 9,197,848 | B2 | 11/2015 | Felkai et al. |
| 9,201,527 | B2 | 12/2015 | Kripalani et al. |
| 9,204,099 | B2 | 12/2015 | Brown |
| 9,219,735 | B2 | 12/2015 | Hoard et al. |
| 9,246,855 | B2 | 1/2016 | Maehiro |
| 9,268,398 | B2 | 2/2016 | Tipirneni |
| 9,298,342 | B2 | 3/2016 | Zhang et al. |
| 9,323,417 | B2 | 4/2016 | Sun et al. |
| 9,335,892 | B2 | 5/2016 | Ubillos |
| 9,349,119 | B2 | 5/2016 | Desai et al. |
| 9,367,224 | B2 | 6/2016 | Ananthakrishnan et al. |
| 9,369,673 | B2 | 6/2016 | Ma et al. |
| 9,407,621 | B2 | 8/2016 | Vakil et al. |
| 9,432,512 | B2 | 8/2016 | You |
| 9,449,303 | B2 | 9/2016 | Underhill et al. |
| 9,450,901 | B1 * | 9/2016 | Smullen ............... H04L 51/046 |
| 9,495,664 | B2 | 11/2016 | Cole et al. |
| 9,516,022 | B2 | 12/2016 | Borzycki et al. |
| 9,525,711 | B2 | 12/2016 | Ackerman et al. |
| 9,553,799 | B2 | 1/2017 | Tarricone et al. |
| 9,563,480 | B2 | 2/2017 | Messerli et al. |
| 9,609,030 | B2 | 3/2017 | Sun et al. |
| 9,614,756 | B2 | 4/2017 | Joshi |
| 9,667,799 | B2 | 5/2017 | Olivier et al. |
| 9,762,709 | B1 | 9/2017 | Snyder et al. |
| 2002/0018051 | A1 | 2/2002 | Singh |
| 2002/0076003 | A1 | 6/2002 | Zellner et al. |
| 2002/0078153 | A1 | 6/2002 | Chung et al. |
| 2002/0188522 | A1 | 12/2002 | McCall et al. |
| 2003/0028647 | A1 | 2/2003 | Grosu |
| 2003/0046421 | A1 | 3/2003 | Horvitz et al. |
| 2003/0154250 | A1 | 8/2003 | Miyashita |
| 2003/0174826 | A1 | 9/2003 | Hesse |
| 2003/0197739 | A1 | 10/2003 | Bauer |
| 2003/0227423 | A1 | 12/2003 | Arai et al. |
| 2004/0039909 | A1 | 2/2004 | Cheng |
| 2004/0054885 | A1 | 3/2004 | Bartram et al. |
| 2004/0098456 | A1 | 5/2004 | Krzyzanowski et al. |
| 2004/0210637 | A1 | 10/2004 | Loveland |
| 2004/0267938 | A1 | 12/2004 | Shoroff et al. |
| 2005/0014490 | A1 | 1/2005 | Desai et al. |
| 2005/0055405 | A1 | 3/2005 | Kaminsky et al. |
| 2005/0055412 | A1 | 3/2005 | Kaminsky et al. |
| 2005/0085243 | A1 | 4/2005 | Boyer et al. |
| 2005/0099492 | A1 | 5/2005 | Orr |
| 2005/0108328 | A1 | 5/2005 | Berkeland et al. |
| 2005/0215229 | A1 | 9/2005 | Cheng |
| 2005/0262542 | A1 | 11/2005 | DeWeese et al. |
| 2005/0288949 | A1 * | 12/2005 | Holbrook ............... G06Q 10/10 434/107 |
| 2006/0004911 | A1 | 1/2006 | Becker et al. |
| 2006/0026255 | A1 | 2/2006 | Malamud et al. |
| 2006/0164552 | A1 | 7/2006 | Cutler |
| 2006/0224430 | A1 | 10/2006 | Butt |
| 2006/0250987 | A1 | 11/2006 | White et al. |
| 2007/0005752 | A1 | 1/2007 | Chawla et al. |
| 2007/0021973 | A1 | 1/2007 | Stremler |
| 2007/0041366 | A1 | 2/2007 | Vugenfirer et al. |
| 2007/0067387 | A1 | 3/2007 | Jain et al. |
| 2007/0091831 | A1 | 4/2007 | Croy et al. |
| 2007/0100986 | A1 | 5/2007 | Bagley et al. |
| 2007/0116225 | A1 | 5/2007 | Zhao et al. |

(56) References Cited

U.S. PATENT DOCUMENTS

| | | |
|---|---|---|
| 2007/0139626 A1 | 6/2007 | Saleh et al. |
| 2007/0198637 A1 | 8/2007 | Deboy et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0080532 A1 | 4/2008 | O'Sullivan et al. |
| 2008/0209452 A1 | 8/2008 | Ebert et al. |
| 2009/0012963 A1 | 1/2009 | Johnson et al. |
| 2009/0100142 A1 | 4/2009 | Stern et al. |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0292999 A1 | 11/2009 | LaBine et al. |
| 2009/0309846 A1 | 12/2009 | Trachtenberg et al. |
| 2010/0005142 A1 | 1/2010 | Xiao et al. |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0094867 A1 | 4/2010 | Badros et al. |
| 2010/0121959 A1 | 5/2010 | Lin et al. |
| 2010/0157978 A1 | 6/2010 | Robbins et al. |
| 2010/0211872 A1 | 8/2010 | Rolston et al. |
| 2010/0245535 A1 | 9/2010 | Mauchly |
| 2010/0262925 A1 | 10/2010 | Liu et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0075830 A1 | 3/2011 | Dreher et al. |
| 2011/0087745 A1 | 4/2011 | O'Sullivan et al. |
| 2011/0131498 A1 | 6/2011 | Chao et al. |
| 2011/0219084 A1 | 9/2011 | Borra et al. |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0013704 A1 | 1/2012 | Sawayanagi et al. |
| 2012/0084714 A1 | 4/2012 | Sirpal et al. |
| 2012/0179502 A1 | 7/2012 | Farooq et al. |
| 2012/0190386 A1 | 7/2012 | Anderson |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0306757 A1 | 12/2012 | Keist et al. |
| 2012/0306993 A1 | 12/2012 | Sellers-Blais |
| 2013/0024784 A1* | 1/2013 | Lifton .................. G06Q 50/01 |
| | | 715/753 |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0061054 A1 | 3/2013 | Niccolai |
| 2013/0063542 A1 | 3/2013 | Bhat et al. |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0125196 A1* | 5/2013 | Shapiro ................ G06F 21/602 |
| | | 726/1 |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0185672 A1 | 7/2013 | McCormick et al. |
| 2013/0198629 A1 | 8/2013 | Tandon et al. |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0068452 A1 | 3/2014 | Joseph et al. |
| 2014/0078182 A1 | 3/2014 | Utsunomiya |
| 2014/0108486 A1 | 4/2014 | Borzycki et al. |
| 2014/0157338 A1 | 6/2014 | Pearce |
| 2014/0161243 A1 | 6/2014 | Contreras et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0317561 A1 | 10/2014 | Robinson et al. |
| 2014/0351327 A1 | 11/2014 | Huang et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0074189 A1 | 3/2015 | Cox et al. |
| 2015/0081885 A1 | 3/2015 | Thomas et al. |
| 2015/0085060 A1 | 3/2015 | Fish et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0172120 A1 | 6/2015 | Dwarampudi et al. |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0373063 A1 | 12/2015 | Vashishtha et al. |
| 2016/0043986 A1 | 2/2016 | Ronkainen |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0173537 A1 | 6/2016 | Kumar et al. |
| 2016/0182580 A1 | 6/2016 | Nayak |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2017/0006162 A1 | 1/2017 | Bargetzi et al. |
| 2017/0006446 A1 | 1/2017 | Harris et al. |
| 2017/0061092 A1* | 3/2017 | Baratpour .............. G16H 30/20 |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0171260 A1 | 6/2017 | Jerrard-Dunne et al. |
| 2017/0324850 A1 | 11/2017 | Snyder et al. |

FOREIGN PATENT DOCUMENTS

| | | |
|---|---|---|
| CN | 102655583 | 9/2012 |
| CN | 102938834 | 2/2013 |
| CN | 103141086 | 6/2013 |
| CN | 204331453 | 5/2015 |
| EP | 959585 | 11/1999 |
| EP | 2081338 B1 | 12/2013 |
| EP | 2341686 | 8/2016 |
| WO | WO 2012/167262 | 12/2012 |
| WO | WO 2014/118736 | 8/2014 |

OTHER PUBLICATIONS

Author Unknown, "'I can see the future' 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

(56) References Cited

OTHER PUBLICATIONS

Author Unknown, "Manage Meeting Rooms in Real Time," Jan. 23, 2017, door-tablet.com, 7 pages.
Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms, Second Edition (excerpt)," http://www.iste.org/docs/excerpts/VIDCO2-excerpt.pdf (last accessed 1011-2013), 2009.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed 10-112013).
Infocus, "Mondopad," Mondopad. http://www.infocus.com/sites/default/files/InFocus-Mondopad--INF5520a-INF7021-Datasheet-EN.pdf (last accessed Oct. 11, 2013), 2013.
Maccormick, John, "Video Chat with Multiple Cameras," CSCW'13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-uc-board- datasheet.pdf, (last accessed Oct. 11, 2013).
Stevenson, Nancy, "Webex Web Meetings for Dummies" 2005, Wiley Publishing Inc., Indianapolis, Indiana, USA, 339 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
Tno, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidvoPanorama—http://www.vidyo.com/products/vidyopanorama/ dated 2013 (last accessed Oct. 11, 2013).

* cited by examiner

FIG. 2

CHAT ROOM ACCESS CONTROL

CROSS-REFERENCE TO RELATED APPLICATION

This application is a continuation of U.S. patent application Ser. No. 15/196,063, filed Jun. 29, 2016, the contents of which is incorporated herein by reference in its entirety.

TECHNICAL FIELD

The present disclosure generally relates to methods and systems for controlling access to chat rooms.

BACKGROUND

Many systems for locking chat rooms are known in the art. For example, a moderator may be able to lock a room. In such systems, people are unable to join a chat room unless they are expressly invited. There are also methods known for blocking existing chat rooms so that such rooms do not appear when they are searched for.

BRIEF DESCRIPTION OF THE DRAWINGS

The present disclosure will be understood and appreciated more fully from the following detailed description, taken in conjunction with the drawings in which:

FIG. 2 is a simplified pictorial illustration of a room request dialog box in the chat room application of FIG. 1;

DESCRIPTION OF EXAMPLE EMBODIMENTS

Overview

In one embodiment, a request to join an electronic chat room is received from a requester. A selection of an access control level for the requester is received via a user interface in order to grant the requester access to the electronic chat room according to a condition for granting access. The user interface is used to assign a selected access control level to the requester, thereupon granting access to the requester. The requester's access to content available in the electronic chat room being limited based on the selected access control level. Related methods, apparatus, and systems are also described.

Example Embodiments

Figure 1:
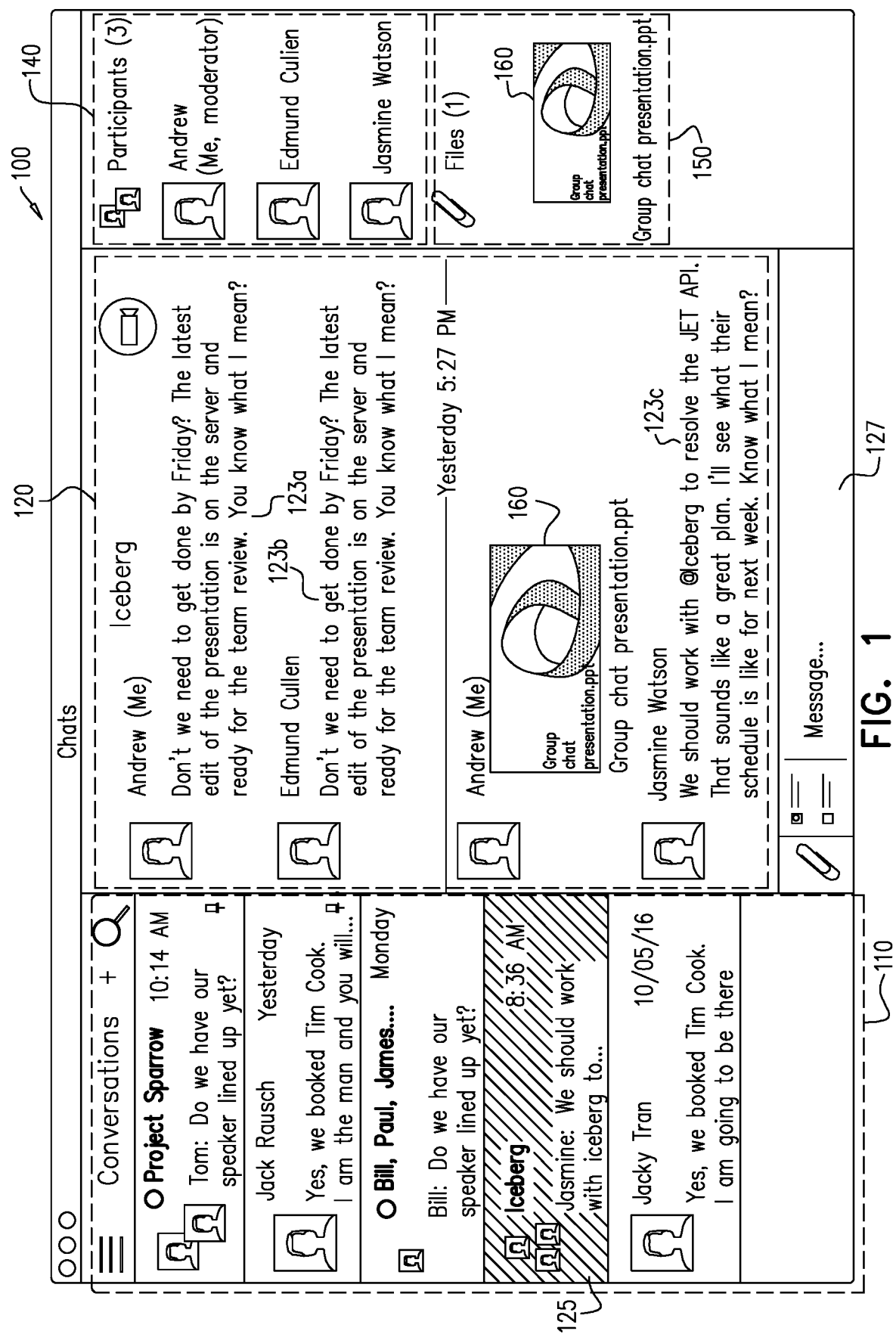
FIG. 1 is a simplified pictorial illustration of a first view of a chat room application constructed and operative in accordance with an embodiment of the present invention.

Reference is now made to FIG. 1, which is a simplified pictorial illustration of a first view of a chat room application 100 constructed and operative in accordance with an embodiment of the present invention. FIG. 1, depicts a view of a chat application 100 of a hypothetical user, Andrew. The depiction of the exemplary application window showing the chat application 100 of FIG. 1 shows several portions in the application window:

a list of chat rooms 110 in chronological order, which shows several chats (i.e. conversations) which a user of the chat room application is (or has at one time) participated in, the most recently visited chat room listed first;

a message portion 120, which shows various messages 123a, 123b, 123c, in one particular chat, such as highlighted chat "Iceberg" 125. Andrew is a participant in the Iceberg 125 chat room, and has moderator rights in the Iceberg. There is also a section for typing new messages 127 in the message portion 120;

a list of participants 140 in the current chat, which also indicates the number of participants in the chat (three, in the present example). Andrew is indicated as "Me" in the list of participants 140. Andrew's moderator status is also indicated; and a list of files 150 which have been added or uploaded to the chat, which also indicates the number of files already uploaded in the chat (one, in the present example).

It is appreciated that the term "conversation", as used above, may, in some applications refer to individual "chat rooms". The terms "conversation", "chat room", and "chat", in their various grammatical forms, may be used interchangeably in the present application and claims.

The list of files 150 mentioned above indicates that, in the present chat, Iceberg 125, one file has been uploaded (i.e. added to the chat). The file 160 itself, in the present example, named "Group chat presentation.ppt" appears in both the message portion 120 of the chat application window, and in the list of files 150. It is appreciated that as more messages are added to the chat, the file 160 will gradually be pushed down, out of the visible portion of the message portion 120. The file 160 is available to the participants 140 in the chat for viewing and downloading. As is noted in the description above of the message portion 120, the file 160 was uploaded by Andrew.

Since the chat room, such as the Iceberg conversation 125 is a persistent chat room, participants in the chat room, such as the participants appearing in the list of participants 140 may not be concerned that their messages and files in a particular chat room are visible and accessible to those already in the chat room, i.e. Iceberg 125. However, should an additional or outside party be added to the chat room at a later date—whether inadvertently or deliberately—the confidentiality of those messages may become compromised.

In one embodiment, access control is exercised over admission of a new participant in the room by way of an access granting condition. By way of example, and without limiting the generality of the foregoing, access to the chat room may be granted according to any of the following conditions:

| | |
|---|---|
| Veto | all the room participants must grant access to a new person being invited to join the room (before they are officially invited or added). |
| Majority | a majority vote of room participants is required in order to grant access to a new person being invited to join the room (before they are officially invited or added). |
| Moderator control | at least one specific participant in the chat room having moderator status can grant access to a new person being invited to join the room (before they are officially invited or added). It is appreciated that some embodiments may require a majority of moderators, or may provide a veto to a single moderator, in order to approve a new participant or to deny a (potential) participant rights to participate in the chat. |

These criteria (i.e., veto, majority, moderator control) to add a new participant into the chat room may be established, in some embodiments, when the chat room is first set up. Alternatively, there might be a domain wide policy (e.g. all chat rooms established inside a given company may require "Veto" or "Moderator Control" for adding a new member.

It is appreciated that the creator of a new chat room automatically becomes a moderator. The creator of the room who is a moderator, can then assign other moderators to a chat room. There may be a mechanism enabling appointing new moderators:

a veto of all members or just the existing moderators may prevent a new moderator from being appointed;

a majority vote of all members or just the existing moderators be required in order to appointed a new moderator, or a moderator may appoint a new moderator.

Figure 2:
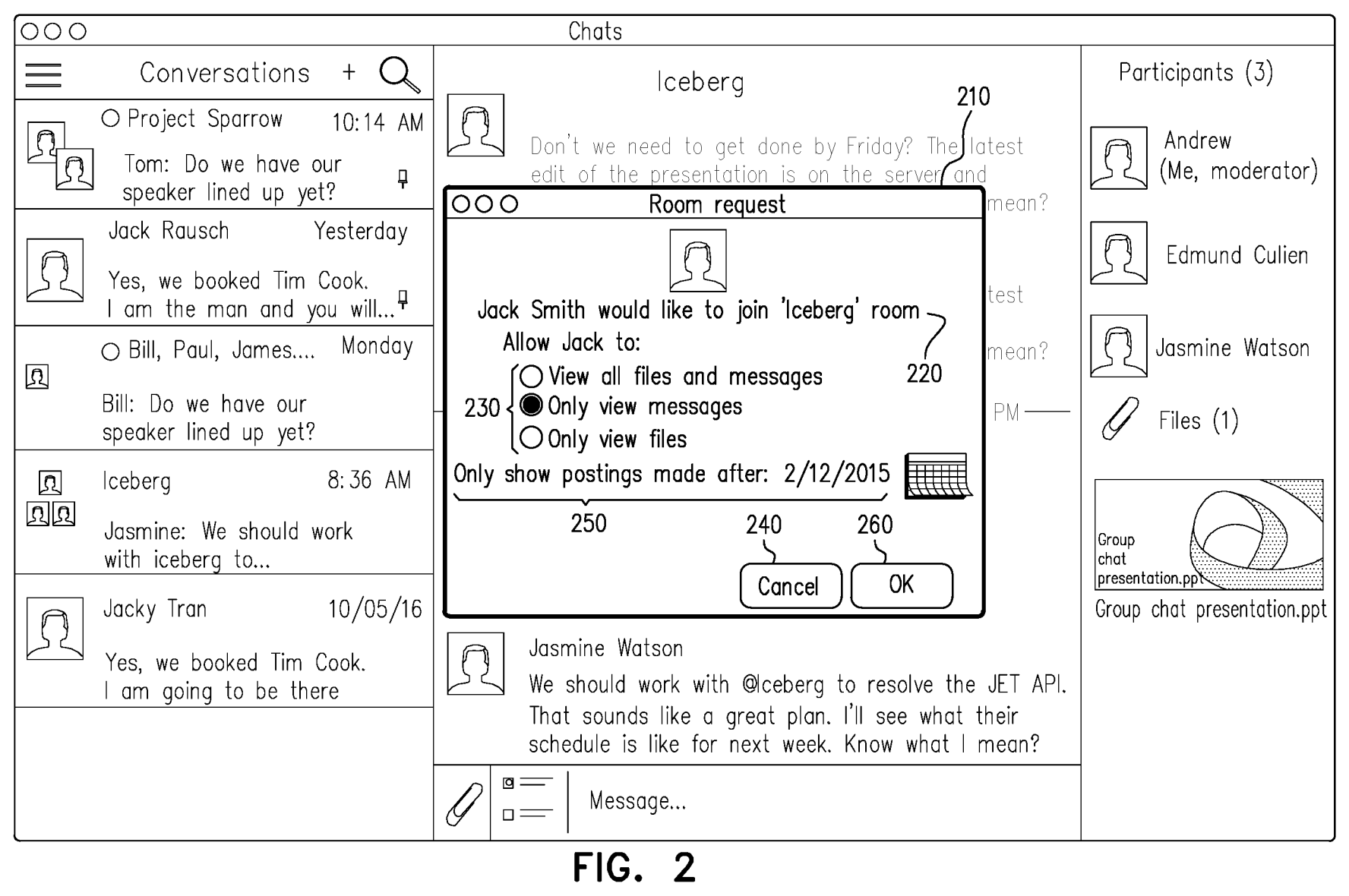

Reference is now made to FIG. 2, which is a simplified pictorial illustration of a room request dialog box 210 in the chat room application of FIG. 1. In FIG. 2, Andrew, a moderator, gets a room request dialog from Jack who wants to join the Iceberg 125 chat room. The room request dialog box 210 comprises a legend, such as legend 220, which indicates that "Jack Smith would like to join the Iceberg room". Assuming, in view of the above discussion that a single moderator, such as Andrew, can add a new participant to the chat room, then Andrew may select one of option buttons 230, enabling Jack to:

View all files and messages which have been and will be uploaded to the chat room;

View only messages, but not files, which have been and will be uploaded to the chat room;

View only files, but not messages, which have been and will be uploaded to the chat room; or Press Cancel 240, effectively denying Jack's request to join the Iceberg chat room 125.

Alternatively, the moderator, Andrew, may invite Jack to join the chat room, and in such a case, the moderator would set the privileges of the invitee (Jack in this case) prior to sending the invitation.

In the present example, Andrew does not want Jack to see the file posted to the room so selects the appropriate one of the option buttons 230, i.e. "Only view messages".

Additionally, Andrew has the option to limit Jack's viewing rights 250, such that Jack may only see messages which were posted after a certain date, Feb. 12, 2015, in the present example. Earlier messages will not appear on Jack's chat application 300 (FIG. 3, below; analogous to Andrew's chat application 100, of FIG. 1).

When Andrew has finished granting Jack's rights, Andrew clicks OK 260 in order to close the room request dialog box 210, thereby enabling Jack's entry to the chat room.

In some embodiments, a new member of the chat room, such as the Iceberg chat room 125, may be granted access until a certain date. For example, Jack may see all content, but only until the 31st December. Additionally, various combinations of the above mentioned conditions may also exist. For example, Jack may be able to view content added to the chat room after 1 June and until 31 December.

It is appreciated that the moderators may extend the rights of a participant in the chat room. For example, a person who has been granted access until a certain date may have their rights extended by a moderator, or by a vote of the other chat room participants (as discussed above). Alternatively, a person who may only view comments or may only view files may have their rights extended to be able to view all postings in the chat room. For example, Jack's access may be extended beyond an assigned access control level which exceeds Jack's original assigned access control level.

Moderators may exercise other forms of content access control, besides the example provided in FIG. 2. Content access control may be granted, for instance, by person, as in FIG. 2. That is to say, viewing rights may be granted to each new participant in a chat room on a per person basis. The viewing rights may be granted depending on a type of content (e.g. files vs. messages). Alternatively, viewing rights may be granted, for instance, by content. For instance, some chat rooms may be open to anyone who wishes to join that chat room. However, a poster, at the time when the poster is making a post (whether a new message or a file) may limit access to the post: Andrew may not view a file; Jack may view the file, but not download it; Sarah may view a message, and so forth.

In addition to the moderator, the uploader of content may also be able to define viewing rights to the content. Accordingly, if Sarah uploads content to the room, Sarah may, at the time when the content is uploaded, define rights to the content in a fashion similar to the moderator's ability to define rights to the chat room.

In still a further embodiment, content access control may be granted on the basis of domain. Files and messages in a chat room may be open to viewing to participants in the chat room from within one domain, may be viewable but not downloadable from a second domain, and may not be viewable at all from a third domain. By way of example, if Andrew is posting from within the www.Andrew.net domain, Andrew may allow other chat room participant's inside the www.Andrew.net domain to have full access to his posts. However, Andrew may elect to deny access to chat room participants from within the www.competitor.org domain. Alternatively, Andrew may elect to make his posts viewable, but not downloadable to chat room participants from www.some_other_domain.com.

In another embodiment, one member of a chat room may not be able to see messages and or content from one or more other members of the chat room. For example, a group of employees may be prevented from seeing messages and content posted by supervisors and managers.

In still another embodiment, content access control may be granted on the basis of time. By way of example, files and messages in a room may be redacted based on date posted, e.g. a new entrant to a chat room may just be given access only to postings from last two weeks.

Figure 3:
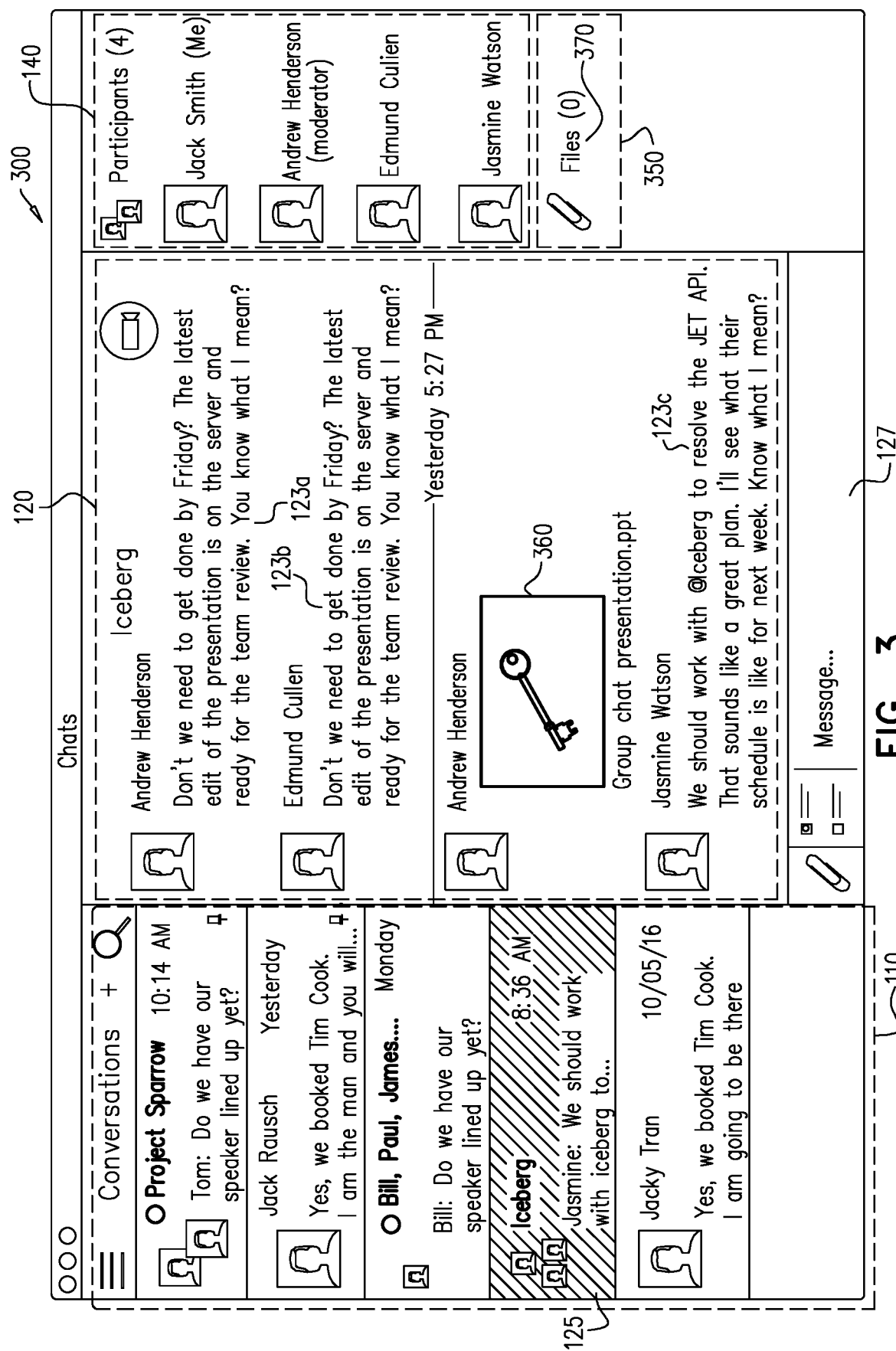
FIG. 3 is a simplified pictorial illustration of a second view of the chat room application of FIG. 1.

Reference is now made to FIG. 3, which is a simplified pictorial illustration of a second view of the chat room application of FIG. 1. FIG. 3 depicts Jack's chat room application 300, which is analogous to Andrew's chat room application 100, depicted in FIG. 1. It can now be seen, by viewing the list of participants 140 that Jack has been added as a participant—the number of participants has been incremented to four now that Jack is a participant in the Iceberg 125 chat room. Since this is Jack's chat room application 300, Jack is indicated as "me". Andrew, the moderator, now appears as a participant in the list.

Additionally, since Jack's ability to view files which have been uploaded to the Iceberg 125 chat room was redacted (as discussed above, with reference to FIG. 2), the file 160 which appeared in FIG. 1 now is shown either as a restricted file, as, for example, in the case of the box showing a key 360, or, alternatively, the list of files 150 (FIG. 1) which showed 1 uploaded file now appears in Jack's chat application 300 as a list of files 350 showing zero uploaded files 370. In some embodiments, Jack could be allowed to request access to the file (for instance where the box showing a key 360 appears). In alternative embodiments, the file may not show at all (for instance where the list of files 350 shows zero uploaded files 370).

It is also appreciated that Jack may scroll through messages appearing in the message portion 120 and view messages appearing from 12 Feb. 2015, but not prior to that date.

In some embodiments explained above, a new participant in the chat room, such as Jack, may be granted total or limited access to future posts and total; limited or no access to previous posts.

In other embodiments, content in chat rooms may be designated as private, and for example, limited to only original participants in the chat room, or open to external or new parties.

Accordingly, in view of FIGS. 1 and 3, it can be seen that in a single chat room, different participants in the chat room may have different views of the chat room, depending on their individual privileges in the chat room.

It is appreciated that each item that get posted in the chat room, such as the Iceberg 125 chat room will be associated ("tagged") with metadata. The metadata will include the identity of the poster, and the date and time the post was made. Thus, for example, the file Group chat presentation.ppt will be tagged as posted by Andrew Henderson at a particular date and time. Thus, when a new member is added to the chat room, such as Jack Smith, in the example of FIGS. 2 and 3, a server which stores the contents of the chat room will be able to determine, according to the rights granted to the new member, what contents of the chat room should be made available to the new member.

In some embodiments, links may be posted to the chat room, rather than content. So, a link to a networked presentation, for example, may be posted, rather than the file 160 itself (i.e. Group chat presentation.ppt). In such a case, all of the various possible embodiments described herein above would apply—i.e. the messages can be seen; or cannot be seen by a particular user; within a given domain, etc. Additionally, the rights of the user who clicks the link to view the file 160 may be restricted by the location of the file 160. For example, and without limiting the generality of the foregoing, a file which is available via a cloud based service would also be restricted according to the cloud based service rights of the user trying to access the file.

The server, accordingly, will store a table which identifies the rights for each participant. The each item in the chat room can then be tested against the participant's rights. For example, the server will only make files visible to a participant who can only view files but not posts in a particular chat room. For a participant who can only view posts but not files in a particular chat room, the server will make the posts visible.

Figure 4:
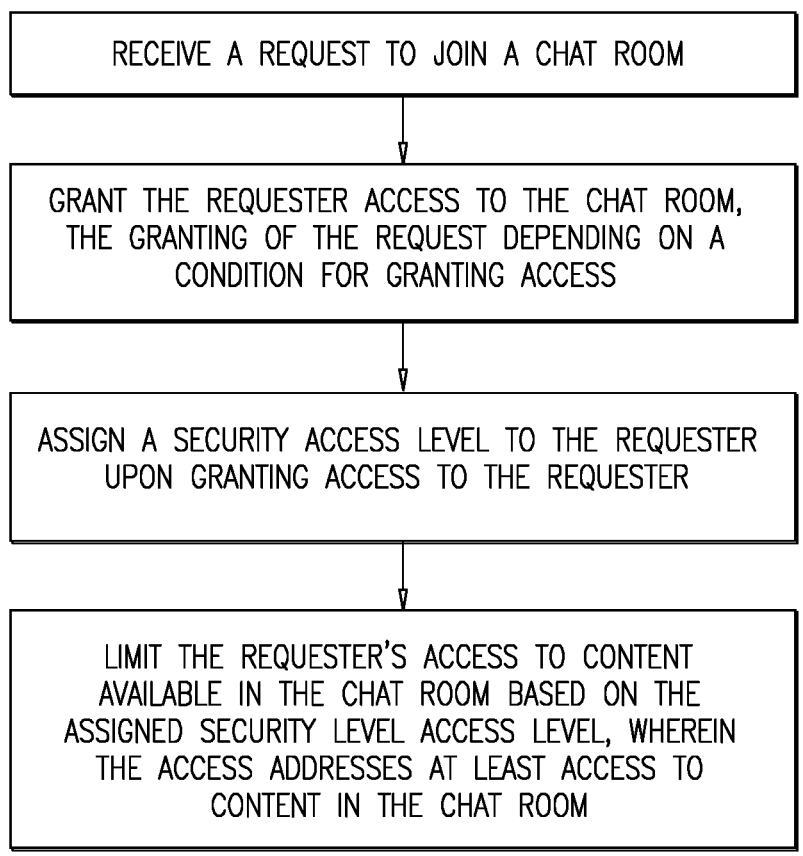
FIG. 4 is a simplified flowchart of a method for implementing embodiments of FIG. 1.

Reference is now made to FIG. 4, which is a simplified flowchart of a method for implementing embodiments of FIG. 1. The method of FIG. 4 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

The invention claimed is:

1. A method comprising:
    enabling a moderator to control access of a user to content of an electronic chat room via a plurality of access levels, wherein the plurality of access levels is associated with a plurality of conditions for granting access, the plurality of conditions including a veto condition, a majority condition, and a moderator approval condition;
    receiving a selection, by the moderator, of one of the plurality of access levels, the one of the plurality of access levels defining access rights to the content based on a certain date that the content is posted in the electronic chat room and one or more domains of users in attempting to access the content;
    assigning the one of the plurality of access levels to the user;
    controlling the access of the user to the content according to the one of the plurality of access levels assigned to the user by limiting the access of the user to the content based on the certain date that the content is posted in the electronic chat room and a domain of the user; and
    limiting the access to at least one of messages or files posted in the electronic chat room after the certain date and/or between a first date and a second date.

2. The method according to claim 1, wherein the veto condition requires granting of access to be approved by all participants in the electronic chat room prior to granting access.

3. The method according to claim 1, wherein the majority condition requires approval of a majority of all participants in the electronic chat room prior to granting access.

4. The method according to claim 1, further comprising:
    limiting the access to at least one of messages or files posted in the electronic chat room prior to the certain date.

5. The method according to claim 1, further comprising:
    limiting the access to the content available in the electronic chat room comprises allowing full access to one of messages or files available in the electronic chat room.

6. The method according to claim 1, wherein the content available in the electronic chat room comprises messages available in the electronic chat room.

7. The method according to claim 1, wherein the content available in the electronic chat room comprises files available in the electronic chat room.

8. The method according to claim 1, wherein the content available in the electronic chat room is stored on a remote server.

9. The method according to claim 8, wherein the content stored on the remote server is stored with associated metadata tags.

10. The method according to claim 1, wherein a view of the electronic chat room available to the user is determined, at least in part, by the access granted to the user.

11. The method according to claim 1, further comprising: receiving a request to join the electronic chat room by a non-participant of the electronic chat room.

12. The method according to claim 1, further comprising: receiving a request to join the electronic chat room by a participant of the electronic chat room on behalf of a non-participant of the electronic chat room.

13. The method according to claim 1, further comprising: extending the access beyond the one of the plurality of access levels to a new access control level which exceeds the one of the plurality of access levels.

14. The method according to claim 1, further comprising: limiting access to new content which is added to the electronic chat room on a per participant basis.

15. The method according to claim 14, wherein the limiting of the access to the new content is performed by the moderator.

16. The method according to claim 14, wherein the limiting of the access to the new content is performed by a poster of the new content.

17. A user interface system for controlling access to a chat room, the user interface system comprising:
a computer-readable memory with software which, when executed, cause the user interface system to:
enable a moderator to control access of a user to content of an electronic chat room via a plurality of access levels, wherein the plurality of access levels is associated with a plurality of conditions for granting access, the plurality of conditions including a veto condition, a majority condition, and a moderator approval condition;
receive a selection, by the moderator, of one of the plurality of access levels, the one of the plurality of access levels defining access rights to the content based on a certain date that the content is posted in the electronic chat room and one or more domains of users in attempting to access the content;
assign the one of the plurality of access levels to the user;
control the access of the user to the content according to the one of the plurality of access levels assigned to the user by limiting the access of the user to the content based on the certain date that the content is posted in the electronic chat room and a domain of the user; and
limit the access to at least one of messages or files posted in the electronic chat room after the certain date and/or between a first date and a second date.

18. A method comprising:
enabling a moderator to control access of a user to content of an electronic chat room via a plurality of access levels, wherein the plurality of access levels is associated with a plurality of conditions for granting access, the plurality of conditions including a veto condition, a majority condition, and a moderator approval condition;
receiving a selection, by the moderator, of one of the plurality of access levels, the one of the plurality of access levels defining access rights to the content based on a certain date that the content is posted in the electronic chat room and one or more domains of users in attempting to access the content;
assigning the one of the plurality of access levels to the user;
controlling the access of the user to the content according to the one of the plurality of access levels assigned to the user by limiting the access of the user to the content based on the certain date that the content is posted in the electronic chat room and a domain of the user; and
limiting the access to the content available in the electronic chat room comprises allowing full access to one of messages or files available in the electronic chat room.

19. The method according to claim 18, further comprising: limiting the access to at least one of messages or files posted in the electronic chat room after the certain date and/or between a first date and a second date.

* * * * *